(12) United States Patent
Henry et al.

(10) Patent No.: US 12,500,943 B2
(45) Date of Patent: *Dec. 16, 2025

(54) DIFFERENTIATED SERVICE IN A FEDERATION-BASED ACCESS NETWORK

(71) Applicant: Cisco Technology, Inc., San Jose, CA (US)

(72) Inventors: Jerome Henry, Pittsboro, NC (US); Robert E. Barton, Richmond (CA); Carlos M. Pignataro, Cary, NC (US); Nagendra Kumar Nainar, Morrisville, NC (US); Malcolm M. Smith, Richardson, TX (US); Mark Grayson, Maidenhead (GB); Bart A. Brinckman, Nevele (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,994

(22) Filed: Jan. 25, 2024

(65) Prior Publication Data

US 2024/0171616 A1 May 23, 2024

Related U.S. Application Data

(63) Continuation of application No. 17/305,235, filed on Jul. 1, 2021, now Pat. No. 11,968,242.

(51) Int. Cl.
*H04L 9/40* (2022.01)
*H04W 12/06* (2021.01)

(52) U.S. Cl.
CPC ........ *H04L 63/205* (2013.01); *H04L 63/0236* (2013.01); *H04L 63/105* (2013.01); *H04W 12/06* (2013.01)

(58) Field of Classification Search
CPC . H04L 63/0236; H04L 63/105; H04L 63/205; H04L 63/0815; H04W 12/06; H04W 12/068; H04W 12/08
USPC .......................................................... 455/410
See application file for complete search history.

(56) References Cited

U.S. PATENT DOCUMENTS

| | | | |
|---|---|---|---|
| 2017/0156105 A1* | 6/2017 | Mustajarvi | H04W 12/06 |
| 2017/0156174 A1* | 6/2017 | Chaponniere | H04W 48/16 |
| 2022/0141704 A1* | 5/2022 | Youtz | H04W 28/0268 |
| | | | 370/252 |

(Continued)

OTHER PUBLICATIONS

Federated Identity Architecture of the European eID System; IEEE 2018; Jesus Carretero (Year: 2018).*

*Primary Examiner* — Hirdepal Singh
(74) *Attorney, Agent, or Firm* — Patterson + Sheridan, LLP

(57) ABSTRACT

Differentiated service in a federation-based access network is provided by receiving a set of credentials from a User Equipment (UE) for a wireless network offering a plurality of service levels. In response to determining that the set of credentials indicate a realm associated with a given service level, network access is provided to the UE according to the given service level. In response to determining that the given service level is not a highest service level in the wireless network, a list of one or more preferred realms is transmitted to the UE, where each realm of the list of one or more preferred realms is associated with one or more higher service levels than the given service level.

20 Claims, 6 Drawing Sheets

(56) References Cited

U.S. PATENT DOCUMENTS

2022/0191192 A1\* 6/2022 Dürr .................. H04L 63/0838
2022/0312368 A1\* 9/2022 Zhang .................. H04W 48/18

\* cited by examiner

DIFFERENTIATED SERVICE IN A FEDERATION-BASED ACCESS NETWORK

CROSS-REFERENCE TO RELATED APPLICATIONS

This application is a continuation of co-pending U.S. patent application Ser. No. 17/305,235 filed Jul. 1, 2021. The aforementioned related patent application is herein incorporated by reference in its entirety.

TECHNICAL FIELD

Embodiments presented in this disclosure generally relate to network management. More specifically, embodiments disclosed herein provide for the exchange and selection of identities and supplemental data to gain access to a network or network-provided service from one of several potential identities.

BACKGROUND

Various networks and services allow users, via associated User Equipment (UE), also referred to as a station (STA) or mobile station, to gain access to the services by associated identities. For example, a first service can provide access once a user confirms an identity or profile provided by the first service (e.g., a username/password combination). However, services can join together to share credentials and user identities to determine how and whether to provide access to an associated service based on an identity used by other services in an identity federation. With the deployment of identity federations, each user can amass an increasingly larger set of possible identities that could be used to onboard to a given network or other federated service.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
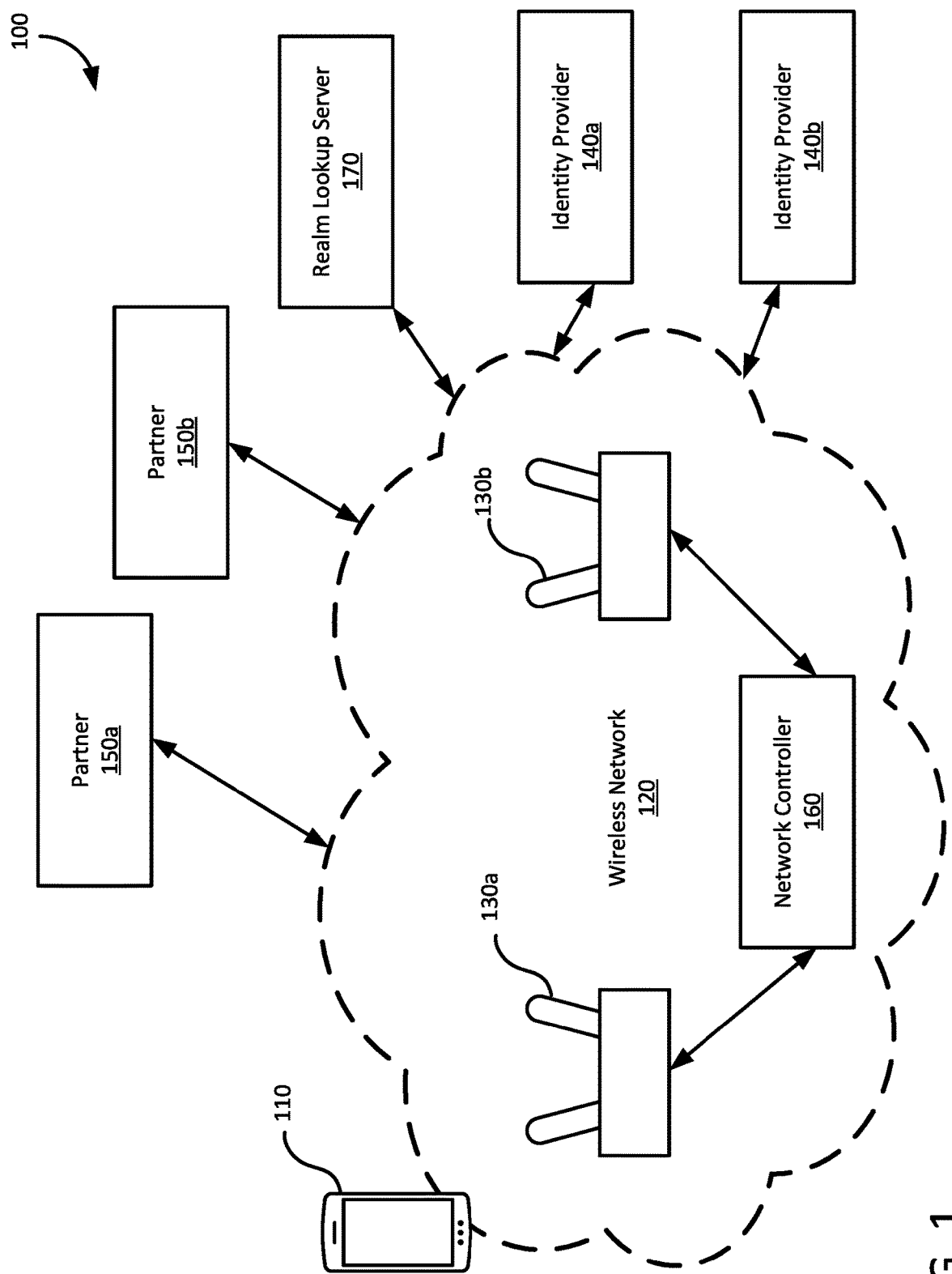
FIG. 1 illustrates a network environment that supports differentiated service in a federation-based access network, according to embodiments of the present disclosure.

One embodiment presented in this disclosure is a method, comprising: receiving a set of credentials from a User Equipment (UE) for a wireless network offering a plurality of service levels; in response to determining that the set of credentials indicate a realm associated with a given service level, providing network access to the UE according to the given service level; and in response to determining that the given service level is not a highest service level in the wireless network, transmitting a list of one or more preferred realms to the UE, wherein each realm of the list of one or more preferred realms is associated with one or more higher service levels than the given service level.

One embodiment presented in this disclosure is a method, comprising: transmitting, from a User Equipment (UE) to an Access Point (AP) in a wireless network offering a plurality of service levels, an access request that includes a first set of credentials including a first realm; gaining network access to the wireless network according to a first service level associated with the first realm; receiving, at the UE from the AP, a list of one or more preferred realms that are associated with higher service levels than the first realm; and transmitting, from the UE to the AP, a second set of credentials including a second realm while accessing the wireless network according to the first service level associated with the first realm.

One embodiment presented in this disclosure is a system, comprising: a processor; a memory storing instructions that when executed by the processor enable the processor to perform operations comprising: receiving a set of credentials from a User Equipment (UE) for a wireless network offering a plurality of service levels; in response to determining that the set of credentials indicate a realm associated with a given service level, providing network access to the UE according to the given service level; and in response to determining that the given service level is not a highest service level in the wireless network, transmitting a list of one or more preferred realms to the UE, wherein each realm of the list of one or more preferred realms is associated with one or more higher service levels than the given service level.

Example Embodiments

The present disclosure provides for differentiated service in a federation-based access network to manage several valid identities for a user seeking to gain access to a network or network-provided service. The herein described differentiated services offer several service levels to different users of the same service (e.g., a wireless network). For example, a single differentiated access network can offer differentiated service such that a first user may be given highest priority access to unlimited bandwidth and access to the full internet, while a second user may be given medium priority access to limited bandwidth (deferring to the first user) and access to a first list of approved internet address, while a third user may be given lowest priority access to congested bandwidth (deferring to the first and second users) and access to a second list of approved internet address (smaller than the first list).

The differentiated access service can determine what service level to provide to a given user based on the identity of that user, but when using an identity federation to identify a given user, rather than a credentialing service internal to or controlled by the service, a given user can have multiple identities to choose from to gain access to service, which the service can associate with different service levels. The user typically supplies a single identity to gain access to the service when using federated identities, and may not know which identity will give the best service level for access. Moreover, the realm through which the user is identified may be unknown to the service provider, and the service provider may thus provide the user with an incorrect service level. To account for these unknowns, the present disclosure provides improvements to the credentialing and onboarding process for a federated service to allow for a highest service level available to a given user to be provided to that user.

FIG. 1 illustrates a network environment 100 that supports differentiated service in a federation-based access network, according to embodiments of the present disclosure. In FIG. 1, a UE 110 seeks to gain access to a wireless network 120, such as a cellular or Wi-Fi based wireless network offered to users in a public or private venue. The service provider can deploy the wireless network via one or more Access Points (APs) 130a-b (generally or collectively, AP 130), and set various controls on the wireless network 120 to confirm the authenticity of an identity of the user (via the UE 110) for permitting access of the appropriate service level. In various embodiments, the wireless network 120 includes a network controller 160 that is in communication with the APs 130 to coordinate network management among the APs 130, although the APs 130 can also manage the network among themselves, thus omitting the network controller 160 in some embodiments.

The UE 110 may include any computing device that is configured to wirelessly connect to one or more APs 130. Example UE 110 can include, but are not limited to: smart phones, feature phones, tablet computers, laptop computers, desktop computers, Internet of Things (IoT) devices, and the like. In various embodiments, the UE 110 can also be referred to as a station (STA), a client device (CD), or an endpoint. Example hardware as may be included in a UE 110 is discussed in greater detail in regard to FIG. 6.

The APs 130 can offer wireless communication sessions in the wireless network 120 according to various Radio Access Technologies and communications standards such as, but not limited to, "Wi-Fi" networking according to the various families, sub-standards, and derivatives of the IEEE 802.11 standard, cellular networking including various generations and subtypes thereof, such as, Long Term Evolution (LTE) and Fifth Generation New Radio (5G NR)) networks, Citizens Broadband Radio Service (CBRS) networks, or the like. Example hardware as may be included in an AP 130 is discussed in greater detail in regard to FIG. 6.

The network controller 160, if included, may include any computing device or cloud based service that is configured to interface with two or more APs 130 to coordinate how spectrum is shared in the environment 100. The network controller 160 can be provided on a separate computing device connected to the individual APs 130 via wired or wireless communications, may be included with a "central" or "commander" AP 130, or may be provided in an ad hoc arrangement via a collective of two or more APs 130 negotiating among themselves for network management. Example hardware as may be included in a network controller 160 is discussed in greater detail in regard to FIG. 6.

When a UE 110 attempts to gain access to the wireless network 120 and associate with an AP 130, the network provider may request that the UE 110 provide an identity for the user so that services can be tracked and allocated properly to the UE 110. In various embodiments, the UE 110 can authenticate directly with the wireless network 120 (e.g., using an identity and credentials set up with the network provider) or can use an externally verified identity that is confirmed via one or more identity providers 140a-b (generally or collectively, identity provider 140). When a service provider (e.g., the network provider) allows for the use of a third-party identity provider 140 (also referred to as an IdP) to gain access to the provider's service (e.g., the wireless network 120), the service provider is said to offer a federated service or participate in an identity federation.

The identity providers 140 are entities that users can create and manage various identities through which the network provider may delegate authentication function to. For example, the user can register with an identity provider 140 of a social network to gain access to the wireless network 120 by authenticating with the social network, which in turn, vouches for the authenticity and identity of the user to the network provider. Accordingly, the network provider, as a service provider, can avoid the need to set up individual accounts for each user attempting to gain access to the wireless network 120, and instead rely on one or more trusted identity providers 140 to verify the identity of the requesting users. In various embodiments, the services of an identity provider 140 can be an on-premises authentication service shared by several service providers in the wireless network 120 or an off-premises authentication service used by several service providers offering one or several wireless networks 120. Example hardware as may be included in a server providing the services of an identity provider 140 is discussed in greater detail in regard to FIG. 6.

Once authenticated by the identity provider 140, the wireless network 120 grants access to the UE 110 based on the supplied credentials. In various embodiments, the authentication process can include the provision of a user name and associated with a given realm or domain (e.g., username at roaming.example.com, username at identities-.example.co.uk), a password, authentication details (e.g., an answer to a security question), multifactor authentication confirmation, and the like. To confirm relations between supplied realms and known realms, the wireless network 120 may be in communication with a realm lookup server 170 (e.g., the domain name registration data service provided by the Internet Corporation for Assigned Names and Numbers (ICANN)) that indicates cross-relations or co-management of multiple differently named realms or domains by a shared party (e.g., when entity A is the registrant for both realm X and realm Y).

For example, the realm of roaming.example.com may be managed by the same entity as the realm of identities.example.co.uk, and the realm lookup server 170 identifies to the provider that sets of credentials authenticated by each of the differently named realms should be treated as belonging to the same realm. Stated differently, if the wireless network 120 provides access at service level A to users authenticated by roaming.example.com, the wireless network 120 should also provide access at service level A when a user is authenticated in the realm of identities.example.co.uk. Example hardware as may be included in a server providing the services of a realm lookup server 170 is discussed in greater detail in regard to FIG. 6.

In various embodiments, the service level of access granted to the user is based on an agreement negotiated between the provider of the wireless network 120 and the identity provider 140 or another partner 150 for related parties. For example, a hotel chain may be a partner 150 that offers users expanded Wi-Fi privileges at a nearby stadium (as a service provider of a wireless network 120) when the users identify themselves via a social media platform (as an identity assigned by the identity provider 140) to the service provider. In another example, a first hotel chain may wish to offer different levels of service in its wireless network 120 to users connecting with a loyalty-program identity versus non-loyalty-based identifiers can access a loyalty program service offered by a partner 150 to identify users who are loyalty program members. Example hardware that may be included in a server providing the services of a partner 150 is discussed in greater detail in regard to FIG. 6.

However, when offering differentiated services based on different identities, the service provider may indicate to the UE 110 that an additional or different set of identity credentials can be provided by the UE 110 to receive a different or higher service level for access to the wireless network 120. A wireless network 120 can provide various benefits to the "higher" service levels that are not provided to the "lower" service levels. These benefits include, but are not limited to faster uplink/downlink speeds (including higher rates of assignment for bandwidth or resource units being competed for), higher data caps, channels associated with lower interference levels, access to more websites/services, permission to use more communications standards or protocols (e.g., streaming, file transfer protocol (FTP), etc.), complementary or "pre-paid" access, higher permitted uplink and downlink transmission powers, greater or different security policies (e.g., firewall services, virus scanning, Virtual Private Network (VPN) services, etc.), and the like. In various embodiments, the service provider can also investigate whether the provided credentials are associated with a realm or domain associated with a different or higher service level for access to the wireless network 120 than is initially known to the service provider.

Figure 2:
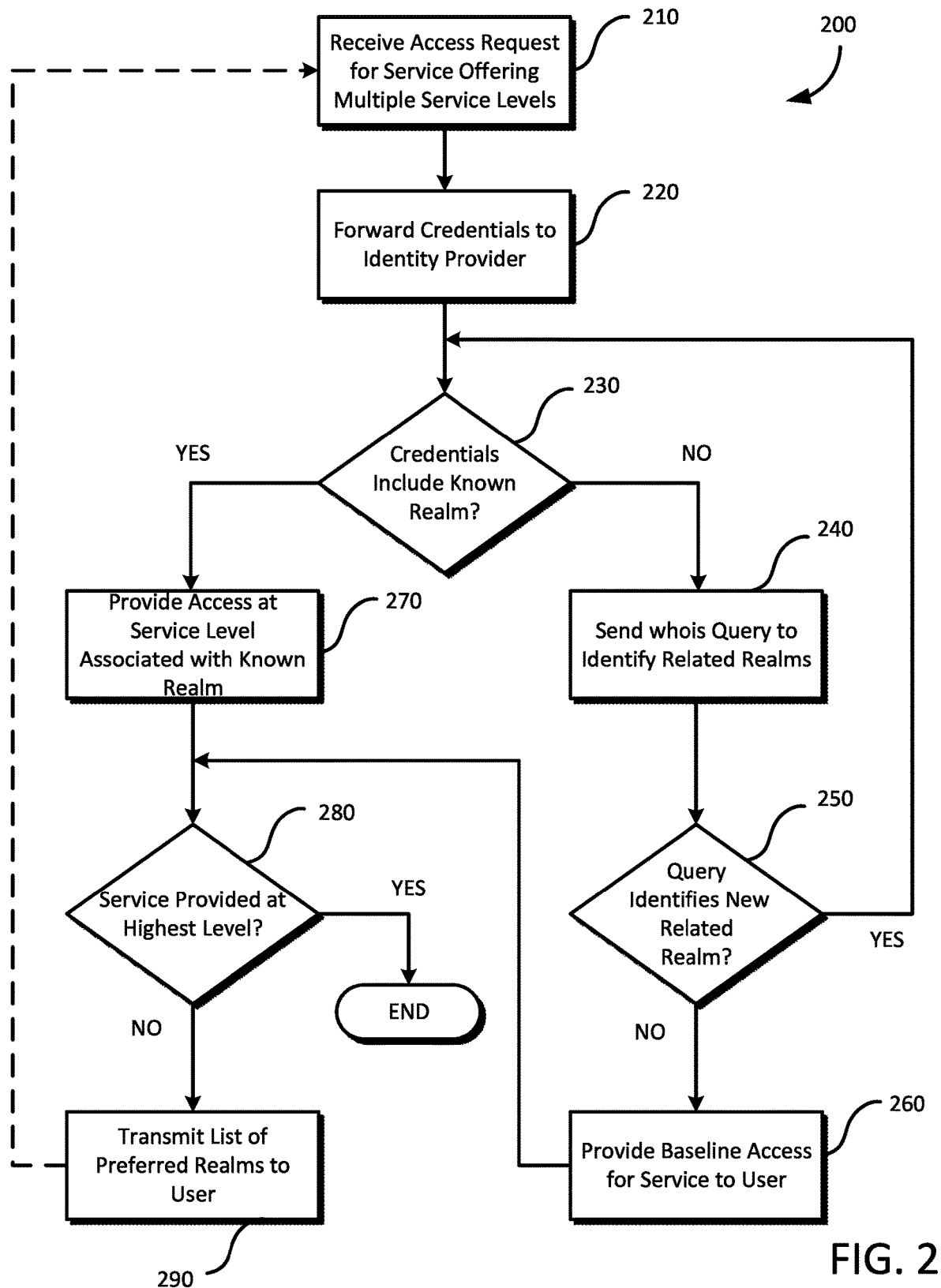
FIG. 2 is a flowchart of a method for providing improved differentiated service in a federation-based network, according to embodiments of the present disclosure.

FIG. 2 is a flowchart of a method 200 for providing improved differentiated service in a federation-based network, according to embodiments of the present disclosure. Method 200 begins at block 210, where an AP 130 receives an access request from a UE 110 for a networking service (e.g., a wireless network 120) that offers multiple levels of service to different classes of users. The access request includes a set of user credentials supplied by the UE 110, which can include a username associated with a realm (or domain), an indication of what identity provider 140 to use for authentication, a password, or additional identity-confirming details.

At block 220, the AP 130 forwards the credentials to an identity provider 140 that participates in an identity federation with the wireless network 120. The identity provider 140 is independently controlled from the wireless network 120, and authenticates the identity of the user on behalf of the wireless network 120. In various embodiments, the identity provider 140 may send a multifactor authentication message to the UE 110 or a secondary device associated with the UE 110 as part of authenticating the user.

At block 230, the AP 130 (or a network controller 160 associated with the AP 130), determines whether the realm supplied by the UE 110 (e.g., per block 210) or a related realm to that supplied by the UE 110 (e.g., identified per block 250) matches a known realm that is associated with a given service level. In various embodiments, the wireless network 120 may set different service levels for users who are authenticated with different identity providers 140, but may also associated a given realm or domain based on a partnership agreement with a partner 150 that is independent from the identity provider 140 and the wireless network 120. When the credentials include a known realm, method 200 proceeds to block 270. When the credentials do not include a known realm, method 200 proceeds to block 240.

At block 240, in response to determining that a known realm has not yet been identified, the AP 130 (or the network controller 160) sends a whois query to a realm lookup server 170 to identify whether any related realms exist for the supplied realm (e.g., supplier per block 210).

At block 250, in response to receiving a response to the whois query from the realm lookup server 170, the AP 130 (or a network controller 160) determines whether the realm lookup server 170 identified a new related realm or a response to the whois query that indicates that no related realms could be discovered. When a new related realm is identified, method 200 returns to block 230 to determine whether the related realm is associated with a known level of service. When a new related realm is not identified, method 200 proceeds to block 260 to provide the baseline service level for access to the service for the realm initially supplied in block 210.

At block 260, the AP 130 provides baseline access for the service to the user (via the associated UE 110). In various embodiments, baseline access is a lowest service level of permitted access to the service, and may be provided to the UE 110 by the AP 130 while awaiting authentication of the user from an identity provider 140 (e.g., to users who are not yet unauthenticated) or authenticated with an unknown realm. By granting access before authentication is complete, the wireless network 120 can begin onboarding the UE 110 to the wireless network 120 sooner (e.g., preparing for load balancing), while also protecting access to bandwidth, and restricting access to various services to preserve service levels for other users who are already fully authenticated.

For example, while authenticating users, a restaurant (as a service provider for a WiFi-based wireless network 120) may provide all potential users with a baseline access level that restricts access to a subset of approved websites and services (e.g., to login to a reservations website, to visit website for menu information, to indicate when a table becomes available). In addition to or instead of using a restricted access list (which may positively recite blocked or permitted services/websites), the baseline access may also be provided with a lower data throughput rate than other higher service levels offered in the differentiated service, with greater deference to other users (when competing for limited bandwidth) who are connected at higher service levels, may be restricted to certain wireless communications channels (e.g., channels with lower interference levels being reserved for higher service levels), restricted to certain uplink or downlink transmission power, or may be otherwise restricted relative to the higher service levels offered in the wireless network 120.

At block 270, in response to determining that the set of user credentials (provided per block 210 an potentially supplemented per block 250) indicate a realm known to be associated with a given service level, the AP 130 provides network access to the UE 110 according to the given service level. The provider of the wireless network 120 determines (at the AP 130 or a network controller 160) the appropriate service level to provide to the UE 110, and may do so without input from the identity provider 140 used to authenticate the user.

In various embodiments, the various service levels offered in the wireless network 120 are based on the identity of the user and the realm in which the identity is based. For example, a user may be identifiable via a social media account, a work-related account, and a travel agency account, which act as separate identity providers 140 or partners 150 with the wireless network 120 to provide more than a baseline level of access to the wireless network 120. Accordingly, a provider can set different service levels when the user is identified through the social media account versus through the work-related account or travel agency account. These different service levels may be the result of the provider placing greater emphasis on certain logins (e.g., a hotel may prioritize business-class users over holiday travelers, and thus give higher service to logins performed with work-related accounts versus social media accounts or travel agency accounts) or the result of an agreement in place with a partner 150 (e.g., a hotel prioritizing travel-agency account users over social-media or business-class users to honor the agreement).

Additionally, the service level provider to the user may be based on the identity or class of the user within the realm. For example, the wireless network 120 at an airport may provide higher service levels to "Gold Level" frequent fliers versus "Bronze Level" frequent fliers of the several airlines' frequent flier programs that base flights out of the airport.

At block 280, the AP 130 determines whether the service level provided to the UE 110 is a highest service level offered in the wireless network 120. When a higher service level than the currently-provided service level is available, method 200 proceeds to block 290. Otherwise, when the currently-provided service level is the highest service level available, method 200 may conclude.

At block 290, the AP 130 transmits a list of preferred realms to the user (via the UE 110) that are associated with service levels associated with higher service levels than the currently-provided service level. In various embodiments, the AP 130 provides a cultivated list with a subset of realms associated with the next-highest service level, or a subset of the realms associated with the highest service level. In various embodiments, the UE 110 can respond with a second set of user credentials (returning method 200 to block 210) with a different realm to attempt to gain access at the higher service level to the wireless network 120.

Figure 3:
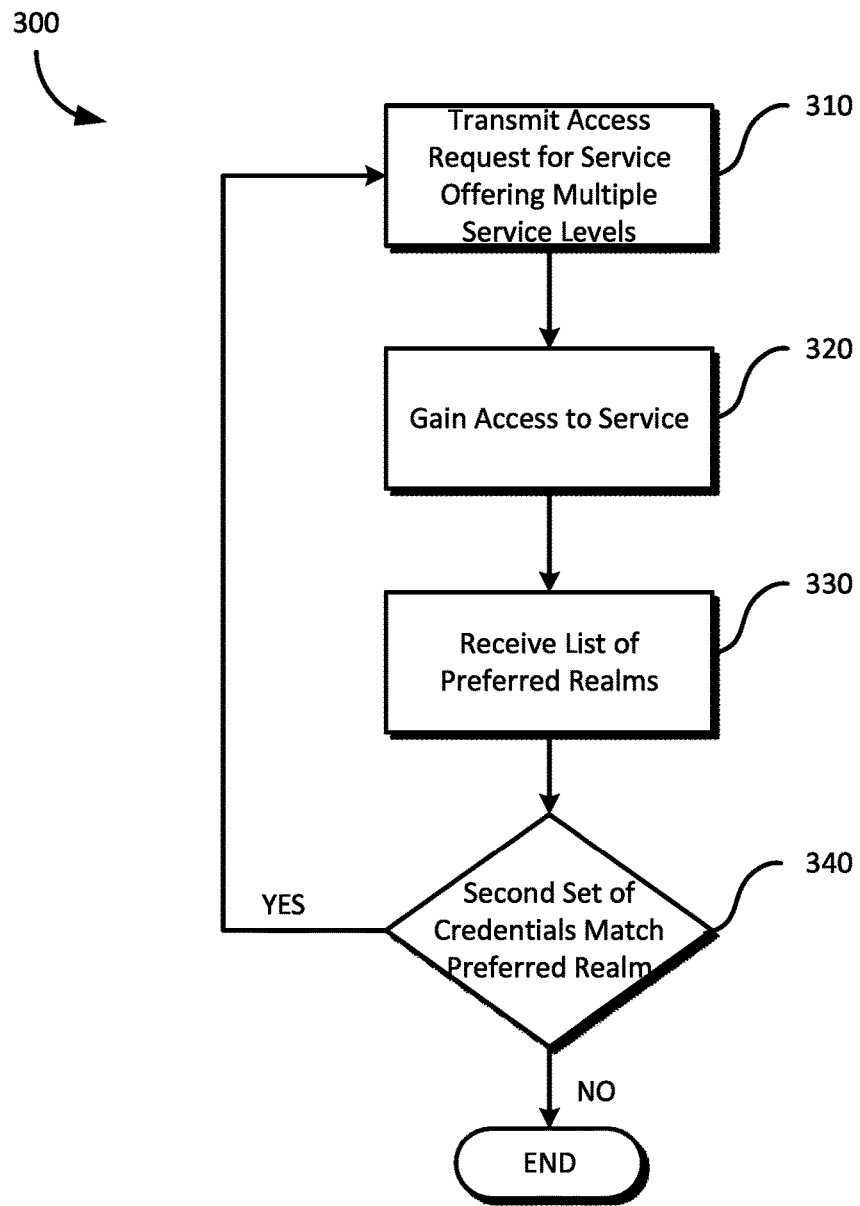
FIG. 3 is a flowchart of a method for improving a service level of differentiated service in a federation-based network, according to embodiments of the present disclosure.

In various embodiments, as described in greater detail in regard to FIG. 3, when the UE 110 responds to the provided list of preferred realms with a second set of user credentials, the second set of credentials may include a realm from the preferred list or a realm not included on the list. Thus, method 200 may return to block 210 for further analysis of the appropriate service level for the subsequent realm. Depending on whether the newly supplied credentials indicate a higher or lower service level (or are associated with a baseline service level), the AP 130 (and network controller 160) can provide the service level of the higher of the current or last-provided service level or the service level provided according to the most recently authenticated realm. For example, if the AP 130 provides a UE 110 with service level B with a preferred list of realms to receive service level A, but the UE 110 responds with a new realm associated with service level C, the AP 130 can continue providing service at service level B or switch to providing service at the lower service level C.

FIG. 3 is a flowchart of a method 300 for improving a service level of differentiated service in a federation-based network, according to embodiments of the present disclosure. Method 300 begins at block 310, where a UE 110 transmits an access request to an AP 130 to gain access to a wireless network 120 that offers multiple different service levels. In various embodiments, the UE 110 (and the user thereof) may be unaware that the wireless network 120 offers differentiated service according to the identity supplied to the wireless network 120, and may provide any set of credentials associated with an identity provider 140 that supports the wireless network 120 to thereby gain access to the wireless network 120.

At block 320, the UE 110 gains access to the services of the wireless network 120 according to the service level associated with the identity provided per block 310. In various embodiments, the UE 110 gains access to a baseline, or lowest, service level offered by the wireless network 120 while authentication (including multifactor authentication) is performed. For example, when supplying an identity associated with service level C in the wireless network 120, the UE 110 is provided with network access at the baseline level of service level D (where C>D) until a positive confirmation of the identity is made via multifactor authentication. By gaining access before authentication is complete, the UE 110 can begin onboarding to the wireless network 120 sooner, while the provider can still protect access to bandwidth, restrict access to various services, and begin accounting for a new device (e.g., for load balancing purposes).

At block 330, in response to the provided identity being associated with a service level other than the highest service level offered by the wireless network 120, the UE 110 receives a list of preferred realms from the AP 130. In various embodiments, the list may indicate the some or all of the realms associated with higher service levels. Depending on the number of realms and number of attempts to authenticate with different identities, the UE 110 may receive lists of preferred realms with more or fewer entries and with different curated selections of the preferred realms. For example, the AP 130 can provide a cultivated list with a subset of realms associated with the next-highest service level so that a UE 110 initially provided with service level C access is provided with a list of preferred realms associated with priority level B (before or instead of being provided with realms associated with level A, where A>B>C). In another example, the AP 130 provides the UE 110 with a list of the preferred realms of the highest priority so that a UE 110 initially provided with service level C access is provided with a list of preferred realms associated with priority level A (before or instead of being provided with realms associated with level B, where A>B>C).

In various embodiments, the UE 110 can retain the list of preferred realms for use in subsequent access requests to the wireless network 120. For example, a user who visits a venue that provides a wireless network 120 on separate dates can initially request access to the wireless network 120 without knowledge of which identities are associated with the highest levels of service. If the user initially supplied a non-preferred identity (associated with a lower service level), the UE 110 will have received a list of preferred realms at the initial visit. However, on a subsequent visit to the venue, the UE 110 may retain the list of preferred realms so that a subsequent access request uses an identity associated with the highest available service level for the user. Accordingly, if a UE 110 initially gains access to the wireless network 120 with a preferred identity (associated with a highest service level), the UE 110 will not have received a list of preferred realms. A UE 110 configured to operate with differentiated networks can therefore recommend to the user re-supplying the preferred identity on a subsequent access request.

At block 340, in response to receiving a list of preferred realms, the UE 110 determines whether a second set of credentials that match one of the preferred realms are to be transmitted to the AP 130 to request a higher service level in the wireless network 120. In various embodiments, the UE 110 can present the user with a prompt (e.g., in a graphical user interface) to identify one or more realms that the user could authenticate through to receive a higher service level. Depending on the user's response to the prompt, the UE 110 determines whether to supply a second set of credentials to the AP 130 to request access at a higher service level, or to maintain the current level of service with the wireless network 120. In other embodiments, the UE 110 can automatically identify whether to request access at a higher service level based on stored access credentials previously provided on the UE 110. For example, when a user has stored identity information and password data on the UE 110, the UE 110 can compare the identity information to the preferred identities and determines to provide a second set of credentials to the AP 130 when a match is discovered.

When the UE 110 determines (automatically or via user command) to supply a second set of credentials to the AP 130, method 300 returns to block 310 to request access using the new credentials. When the UE 110 determines to maintain access at the current service level (e.g., due to no matches to the preferred list or a lock of user approval), method 300 may conclude.

Figure 4:
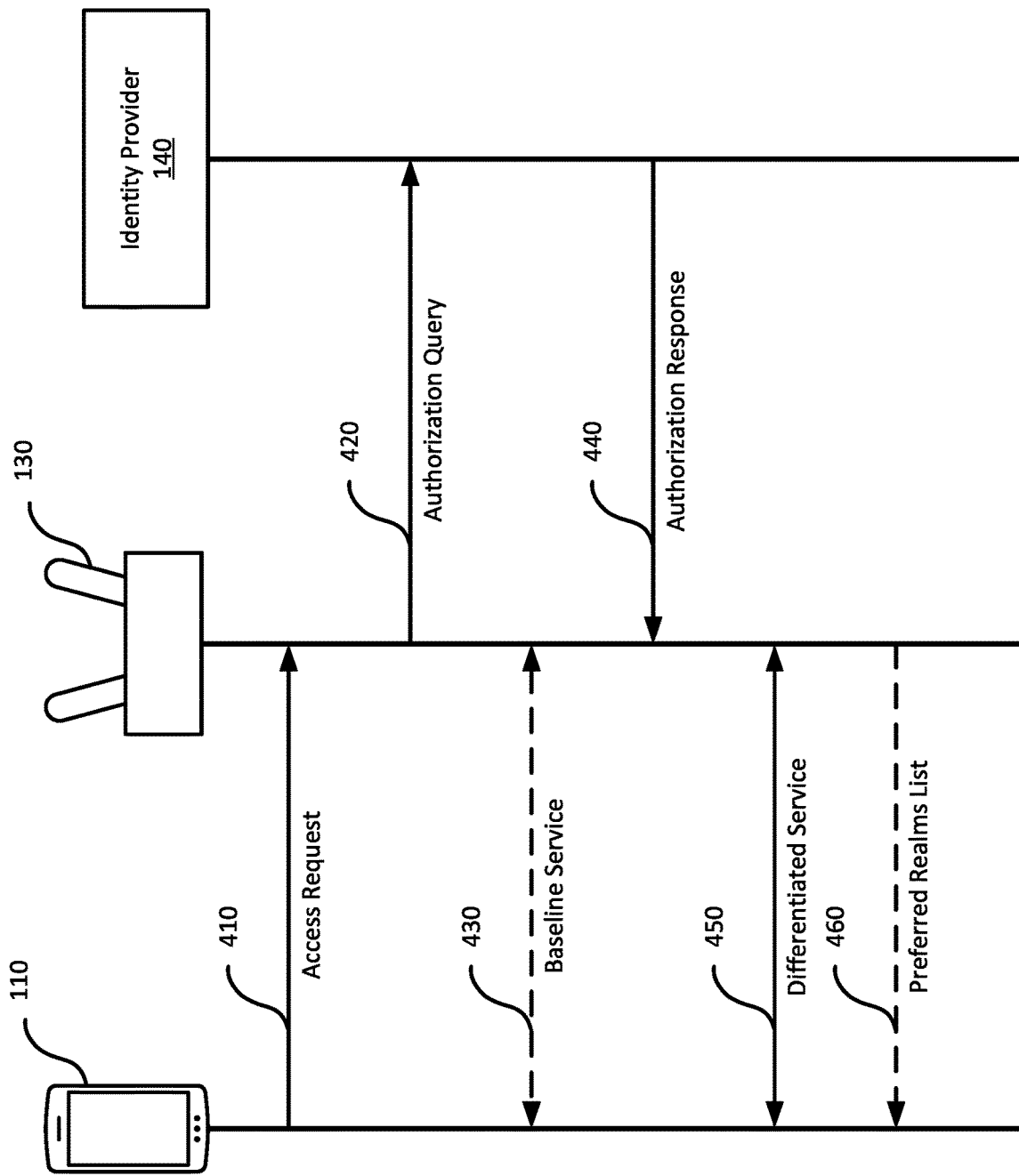
FIG. 4 is a timing diagram for providing differentiated service in a wireless network, according to embodiments of the present disclosure.

FIG. 4 is a timing diagram for providing differentiated service in a wireless network 120, according to embodiments of the present disclosure. In FIG. 4, a UE 110 sends an access request 410 to an AP 130 in the wireless network 120, which forwards the supplied credentials to an identity provider 140.

The identity provider 140, in turn, based on the supplied credentials, returns an authorization response 440 to the AP 130 (in some embodiments via a network controller 160) indicating whether the user is authenticated. In various embodiments, the authentication can be based on the supplied credentials matching known values stored at the identity provider 140, and may include additional steps, such as a multifactor authentication or additional security questions. Although not illustrated, multifactor queries and responses can be sent between the identity provider 140 (or a third party authenticator in communication with the identity provider 140) and the UE 110 or another device associated with the UE 110 (and nominally in the user's possession) to confirm that the access request was generated by the user. In various embodiments, the identity provider 140 can forward acceptance or rejection of the multifactor response to the wireless network 120 separately from or included in the authorization response 440.

In various embodiments, in the time between receiving the access request 410 from the UE 110 and the authorization response 440 from the identity provider 140, the AP 130 provides (and the UE 110 receives) access to the wireless network 120 according to a baseline service 430. The baseline service 430 can include uplink transmissions from the UE 110 to the AP 130 and downline transmissions from the AP 130 to the UE 110 for a curated set of network resources (e.g., only to permitted services) and may be used to transfer data in anticipation for full onboarding to the wireless network 120 (e.g., for load balancing purposes).

Once the AP 130 (or the network controller 160) receives the authorization response 440 from the identity provider 140, the AP 130 provides (and the UE 110 receives) differentiated service 450 based on the identity used to gain access to the wireless network 120. In various embodiments, when the authorization response 440 indicates an authorization failure (e.g., when a password does not match a username, multifactor authentication fails, etc.) the AP 130 terminates service to the UE 110. In various embodiments, the differentiated service 450 may be the same as or different from the baseline service 430 depending on the policies of the wireless network 120 in relation to the realm of the supplied identity.

In various embodiments, when the differentiated service 450 is provided at a lower service level than the highest service level offered in the wireless network 120, the AP 130 transmits preferred realms list 460 to the UE 110. The preferred realms list 460 can identify one or more realms that are associated with higher service levels in the wireless network 120 than the currently provided service level in the differentiated service 450. The UE 110, on behalf of the user, can transmits a subsequent access request 410 with a credential set associated with a different realm, including realms specifically recited in the preferred realms list 460 or realms not specifically recited in the preferred realms list 460 believed to be related to a specifically recited realm. In various embodiments, the AP 130 provides the preferred realms list 460 via an Access Network Query Protocol (ANQP) query/response choreography with the UE 110.

Figure 5:
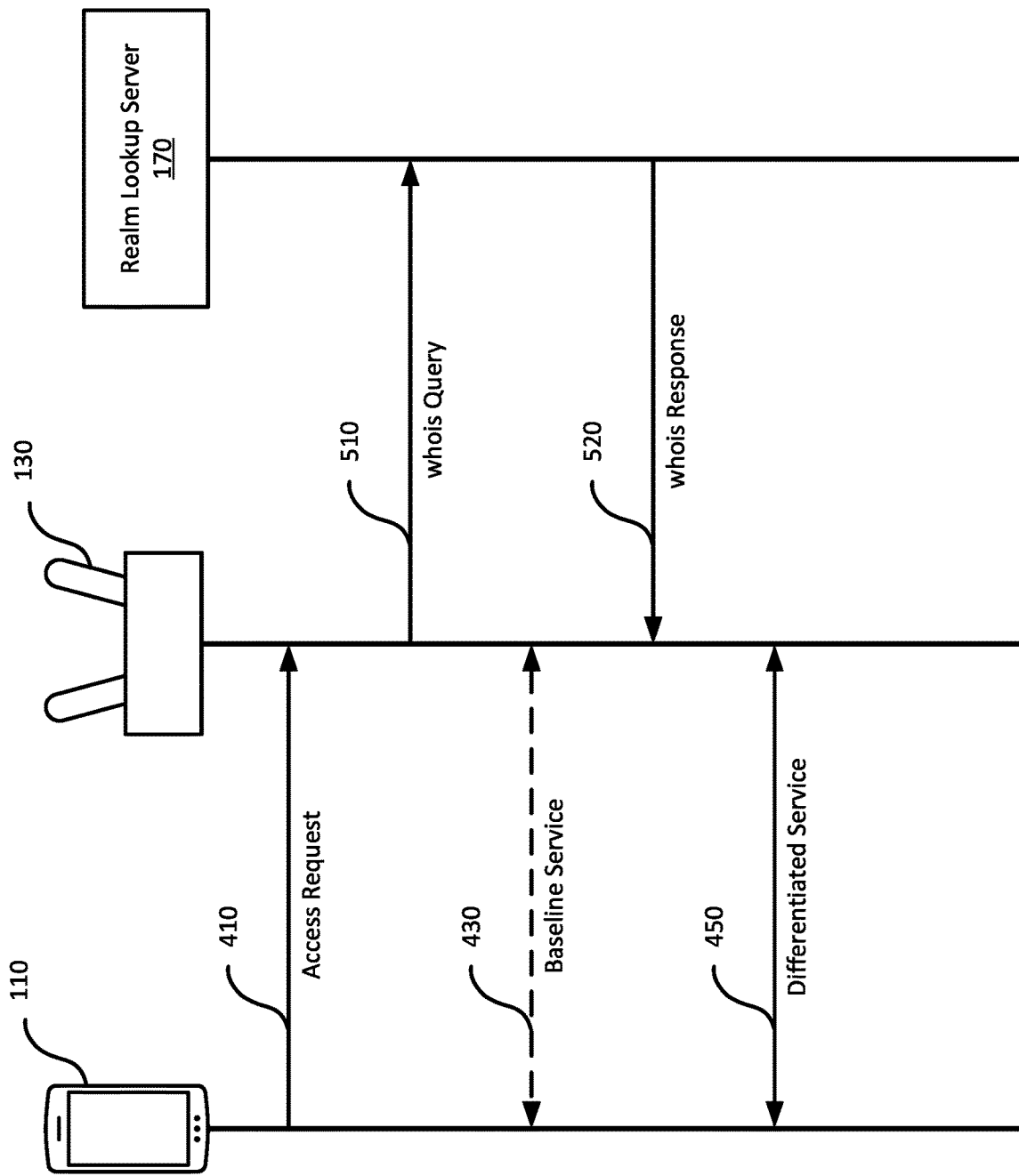
FIG. 5 is a timing diagram for providing differentiated service in a wireless network, according to embodiments of the present disclosure.

FIG. 5 is a timing diagram for providing differentiated service in a wireless network 120, according to embodiments of the present disclosure. The actions shown in FIG. 5 may be performed in parallel to those shown in FIG. 4 for granting differentiated access to a wireless network 120. In FIG. 5, a UE 110 sends an access request 410 to an AP 130 in the wireless network 120, which forwards the supplied credentials to an identity provider 140, as is shown in FIG. 4. However, when the supplied realm is unknown to the wireless network 120, the AP 130 (or the network controller 160) transmits a whois query 510 to a realm lookup server 170.

The realm lookup server 170 transmits a whois response 520 back to the AP 130 (or the network controller 160), which can include fields such as the registrant contract name or organization for the unknown realm. The AP 130 (or the network controller 160) compare the contents of the whois response 520 with similar fields for known realms to identify matches (e.g., related realms). For example, if the realm of "remote.example.com" and "roaming.example.co.uk" indicate a shared registrant, the two realms can be treated as being related, and are therefore associated with the same service level to provide in the wireless network 120.

After determining whether the supplied unknown realm is equivalent to a known realm, the AP 130 provides (and the UE 110 receives) differentiated service based on the identity (or the related realm thereto) used to gain access to the wireless network 120.

In various embodiments, in the time between receiving the access request 410 from the UE 110 and the whois response 520 from the identity provider 140, the AP 130 provides (and the UE 110 receives) access to the wireless network 120 according to a baseline service 430. The baseline service 430 can include uplink transmissions from the UE 110 to the AP 130 and downline transmissions from the AP 130 to the UE 110 for a curated set of network resources (e.g., only to permitted services) and may be used to transfer data in anticipation for full onboarding to the wireless network 120 (e.g., for load balancing purposes). In various embodiments, the differentiated service 450 may be the same as or different from the baseline service 430 depending on the policies of the wireless network 120 in relation to the realm of the supplied identity.

In various embodiments, as is discussed in relation to FIG. 4, when the related realm is a not a preferred realm (e.g., associated with a highest service level in the wireless network 120), the AP 130 transmits a preferred realms list 460 to the UE 110. However, when the related realm is a preferred realm (despite the initially provided realm not being matched to a preferred realm), the AP 130 refrains from transmitting the preferred realms list 460. Accordingly, in some embodiments, the AP 130 may delay sending the preferred realms list 460 until the whois response 520 is received.

Figure 6:
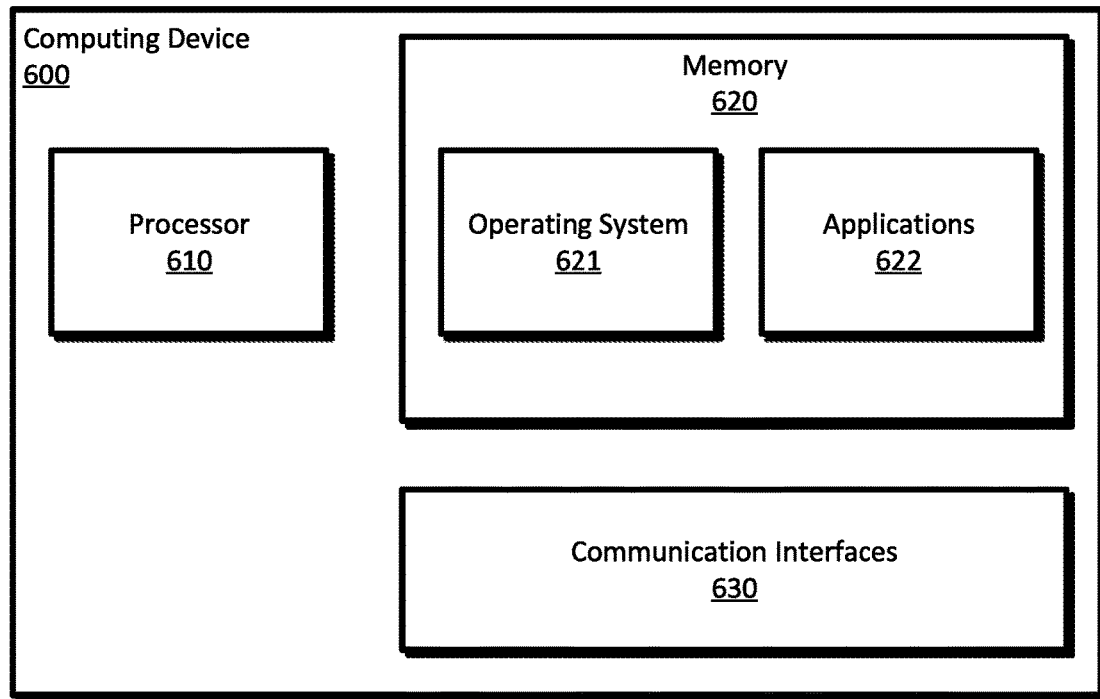
FIG. 6 illustrates hardware of a computing device, according to embodiments of the present disclosure.

FIG. 6 illustrates hardware of a computing device 600 such as can be included in a UE 110, an AP 130, a network controller 160, or a server used to provide the services of an identity provider 140, partner 150, or realm lookup server 170 as described herein. The computing device 600 includes a processor 610, a memory 620, and communication interfaces 630. The processor 610 may be any processing element capable of performing the functions described herein. The processor 610 represents a single processor, multiple processors, a processor with multiple cores, and combinations thereof. The communication interfaces 630 facilitate communications between the computing device 600 and other devices. The communication interfaces 630 are representative of wireless communications antennas (both omnidirectional and directional), various steering mechanisms for the antennas, and various wired communication ports including out-pins and in-pins to a microcontroller. The memory 620 may be either volatile or non-volatile memory and may include RAM, flash, cache, disk drives, and other computer readable memory storage devices. Although shown as a single entity, the memory 620 may be divided into different memory storage elements such as RAM and one or more hard disk drives.

As shown, the memory 620 includes various instructions that are executable by the processor 610 to provide an operating system 621 to manage various functions of the computing device 600 and one or more applications 622 to provide various functionalities to users of the computing device 600, which include one or more of the functions and functionalities described in the present disclosure.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving a set of credentials from a User Equipment (UE) for a wireless network offering a plurality of service levels;
   providing network access to the UE according to a baseline service level while authenticating the set of credentials;
   in response to determining that the set of credentials indicate a realm associated with a given service level, providing network access to the UE according to the given service level; and
   in response to determining that the given service level is not a highest service level in the wireless network:
      determining a list of one or more preferred realms associated with one or more higher service levels than the given service level; and
      transmitting the list of one or more preferred realms to the UE.

2. The method of claim 1, further comprising:
   receiving a second set of credentials from the UE; and
   in response to determining that the second set of credentials are not associated with a given realm associated with a particular service level, sending a query to a realm lookup server to identify additional realms associated with the given realm indicated in the second set of credentials.

3. The method of claim 2, further comprising:
   in response to determining that the query has identified at least one additional realm associated with a known realm associated with a known service level, providing network access to the UE according to a higher of the given service level and the known service level.

4. The method of claim 2, further comprising:
   in response to determining that the query has not identified at least one additional realm associated with a known realm associated with a known service level, providing network access to the UE according to a higher of the given service level and the baseline service level for the wireless network.

5. The method of claim 2, wherein the query identifies related realms to the given realm indicated in the second set of credentials based on registration data for the related realms indicating a shared entity with registration data for the given realm.

6. The method of claim 1,
   wherein the baseline service level is provided while awaiting confirmation of the set of credentials via multifactor authentication.

7. The method of claim 6, further comprising:
   in response to detecting failure of the multifactor authentication, terminating network access to the UE.

8. The method of claim 1, wherein the wireless network associates the given service level with the realm based on a partnership agreement with a partner that is independent from the wireless network.

9. A method, comprising:
   transmitting, from a User Equipment (UE) to an Access Point (AP) in a wireless network offering a plurality of service levels, an access request that includes a first set of credentials including a first realm;
   gaining network access to the wireless network according to a first service level associated with the first realm;
   receiving, at the UE from the AP, a list of one or more preferred realms that are associated with higher service levels than the first realm; and
   transmitting, from the UE to the AP, a second set of credentials including a second realm while accessing the wireless network according to the first service level associated with the first realm.

10. The method of claim 9, wherein the second realm is not included in the list of one or more preferred realms, wherein the UE identifies that the second realm is a related realm to at least one realm included in the list of one or more preferred realms.

11. The method of claim 9, wherein the first realm is unknown to the wireless network, wherein the list of one or more preferred realms that are associated with higher service levels than the first realm is received in response to the AP identifying that the first realm is not related to any realm included in the list of one or more preferred realms.

12. The method of claim 9, further comprising:
   receiving, at the AP, a multifactor authentication query associated with the first set of credentials;
   transmitting, from the UE, a multifactor authentication response to an identity provider; and
   accessing the wireless network according to a baseline service level before the identity provider indicates acceptance of the multifactor authentication response to the wireless network,
   wherein gaining access to the wireless network according the first service level is performed in response to the wireless network accepting the multifactor authentication response from the identity provider.

13. A system, comprising:
   a processor;
   a memory storing instructions that when executed by the processor enable the processor to perform operations comprising:
      receiving a set of credentials from a User Equipment (UE) for a wireless network offering a plurality of service levels;
      providing network access to the UE according to a baseline service level while authenticating the set of credentials;
      in response to determining that the set of credentials indicate a realm associated with a given service level, providing network access to the UE according to the given service level; and
      in response to determining that the given service level is not a highest service level in the wireless network:
         determining a list of one or more preferred realms associated with one or more higher service levels than the given service level; and
         transmitting the list of one or more preferred realms to the UE.

14. The system of claim 13, wherein the operations further comprise:
  receiving a second set of credentials from the UE; and
  in response to determining that the second set of credentials are not associated with a given realm associated with a particular service level, sending a whois query to a realm lookup server to identify additional realms associated with the given realm indicated in the second set of credentials.

15. The system of claim 14, wherein the operations further comprise:
  in response to determining that the whois query has identified at least one additional realm associated with a known realm associated with a known service level, providing network access to the UE according to a higher of the given service level and the known service level.

16. The system of claim 14, wherein the operations further comprise:
  in response to determining that the whois query has not identified at least one additional realm associated with a known realm associated with a known service level, providing network access to the UE according to a higher of the given service level and the baseline service level for the wireless network.

17. The system of claim 14, wherein the whois query identifies related realms to the given realm indicated in the second set of credentials based on registration data for the related realms indicating a shared entity with registration data for the given realm.

18. The system of claim 13, wherein the baseline service level is provided while awaiting confirmation of the set of credentials via multifactor authentication.

19. The system of claim 18, wherein the operations further comprise:
  in response to detecting failure of the multifactor authentication, terminating network access to the UE.

20. The system of claim 13, wherein the wireless network associates the given service level with the realm based on a partnership agreement with a partner that is independent from the wireless network.

* * * * *